(12) United States Patent
Xu et al.

(10) Patent No.: US 10,810,090 B2
(45) Date of Patent: Oct. 20, 2020

(54) AGENT-LESS DISK PARTITION BACKUP

(71) Applicant: EMC IP Holding Company LLC, Hopkinton, MA (US)

(72) Inventors: Dening Xu, Chengdu (CN); Feng Ou, Chengdu (CN); Qingxiao Zheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/137,272

(22) Filed: Sep. 20, 2018

(65) Prior Publication Data
US 2020/0019473 A1    Jan. 16, 2020

(30) Foreign Application Priority Data
Jul. 10, 2018    (CN) .......................... 2018 1 0753506

(51) Int. Cl.
*G06F 11/14* (2006.01)
*G06F 3/06* (2006.01)
(Continued)

(52) U.S. Cl.
CPC .......... *G06F 11/1464* (2013.01); *G06F 3/067* (2013.01); *G06F 3/0631* (2013.01);
(Continued)

(58) Field of Classification Search
CPC ............... G06F 1/00–3296; G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211;
(Continued)

(56) References Cited

U.S. PATENT DOCUMENTS 5,706,472 A * 1/1998 Ruff ...................... G06F 3/0601
711/112
7,966,290 B2 * 6/2011 Gupta ................. G06F 11/1466
707/640

(Continued)

OTHER PUBLICATIONS

Y. Zhang, Y. Wu and G. Yang, "Droplet: A Distributed Solution of Data Deduplication," 2012 ACM/IEEE 13th International Conference on Grid Computing, Beijing, 2012, pp. 114-121, doi: 10.1109/Grid.2012.21. (Year: 2012).*

*Primary Examiner* — Daniel C. Chappell
(74) *Attorney, Agent, or Firm* — Womble Bond Dickinson (US) LLP

(57) ABSTRACT

Disclosed is a method, apparatus, and system for performing proxy-based partition backup in a virtualized environment, the operations comprising: mounting a backup source virtual machine disk to a backup proxy; obtaining, at the backup proxy, partition information for a backup source partition on the backup source virtual machine disk; and reading, by the backup proxy, partition data of the backup source partition based on the partition information and backing up the partition data to a data store.

15 Claims, 5 Drawing Sheets

(51) Int. Cl.
*G06F 9/455* (2018.01)
*H04L 29/08* (2006.01)

(52) U.S. Cl.
CPC ........ *G06F 3/0662* (2013.01); *G06F 9/45558* (2013.01); *H04L 67/28* (2013.01); *G06F 2009/45562* (2013.01); *G06F 2009/45583* (2013.01); *G06F 2201/815* (2013.01)

(58) Field of Classification Search
CPC ........ G06F 2213/00–4004; G06F 2216/00–17; G06F 2221/00–2153; H04L 41/00–5096; H04L 49/00–9094; H04L 61/00–6095; H04L 67/00–42
See application file for complete search history.

(56) References Cited

U.S. PATENT DOCUMENTS

| | | | |
|---|---|---|---|
| 8,473,698 B2* | 6/2013 | Lionetti | G06F 3/0689 711/162 |
| 8,495,317 B2* | 7/2013 | Chandra | G06F 11/1466 711/162 |
| 8,782,008 B1* | 7/2014 | Xing | H04L 67/28 707/660 |
| 9,563,514 B2* | 2/2017 | Dornemann | G06F 9/45558 |
| 9,628,561 B1* | 4/2017 | Kulkarni | H04L 67/1095 |
| 9,665,445 B1* | 5/2017 | Acharya | G06F 11/1464 |
| 9,740,577 B1* | 8/2017 | Chakraborty | G06F 11/1469 |
| 10,148,780 B2* | 12/2018 | Dornemann | H04L 67/28 |
| 2017/0228294 A1* | 8/2017 | Acharya | G06F 11/1464 |

* cited by examiner

AGENT-LESS DISK PARTITION BACKUP

RELATED APPLICATIONS

This application claims priority, under 35 U.S.C. Section 119, of Chinese Patent Application 201810753506.8 filed on Jul. 10, 2018 and entitled "METHOD, APPARATUS, AND DATA PROCESSING SYSTEM FOR AGENT-LESS DISK PARTITION BACKUP."

FIELD OF THE INVENTION

Embodiments of the disclosure relate to electronic devices, and in particular, to data backup and restoration in a virtualized environment.

BACKGROUND

In a virtualized environment, backing up of virtual machine data may be performed using either a virtualized backup proxy or an agent (specialized software) installed in the virtual machine.

With backup proxy-based backup, a virtualized backup proxy (i.e., a specialized virtual machine) may be deployed in the virtual environment (e.g., the VMware vSphere platform) where virtual machines whose data needs backing up also reside. The backup proxy has access to both the virtual machine disk images (e.g., virtual machine disk "VMDK" files) in the virtual environment and the external data store where backed up data is stored. Backup is performed under the control of a backup server that is in communication with the backup proxy. Usually the unit of proxy-based backup is a virtual machine disk. Data exclusion features are in existence that allow users to manually exclude files and/or folders on the virtual machine disk from being backed up, which can also be used for excluding garbage or temporary data that are generated in a running virtual machine. Requiring the user to manually exclude data that do not need to be backed up may be inefficient and cumbersome.

With agent-based backup, a backup agent may be deployed in each virtual machine whose data needs backing up. Backup is coordinated through the backup agent under the control of the backup server. Agent-based backup is usually flexible, and can be used to back up application data and/or a file system. However, to perform an agent-based backup, the virtual machine and the installed agent both need to be running.

Neither the conventional proxy-based backup nor the conventional agent-based backup allows for the backing up of only a particular partition on a virtual machine disk image.

BRIEF DESCRIPTION OF THE DRAWINGS

Embodiments of the disclosure are illustrated by way of example and not limitation in the Figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to a method, apparatus, and system for backing up a partition of a virtual machine disk. As a person skilled in the art would understand, a partition refers to a region on a disk drive that is managed by the operating system separately from other regions. A disk drive or image may comprise one or more partitions, each of which may be associated with a file system.

Figure 1:
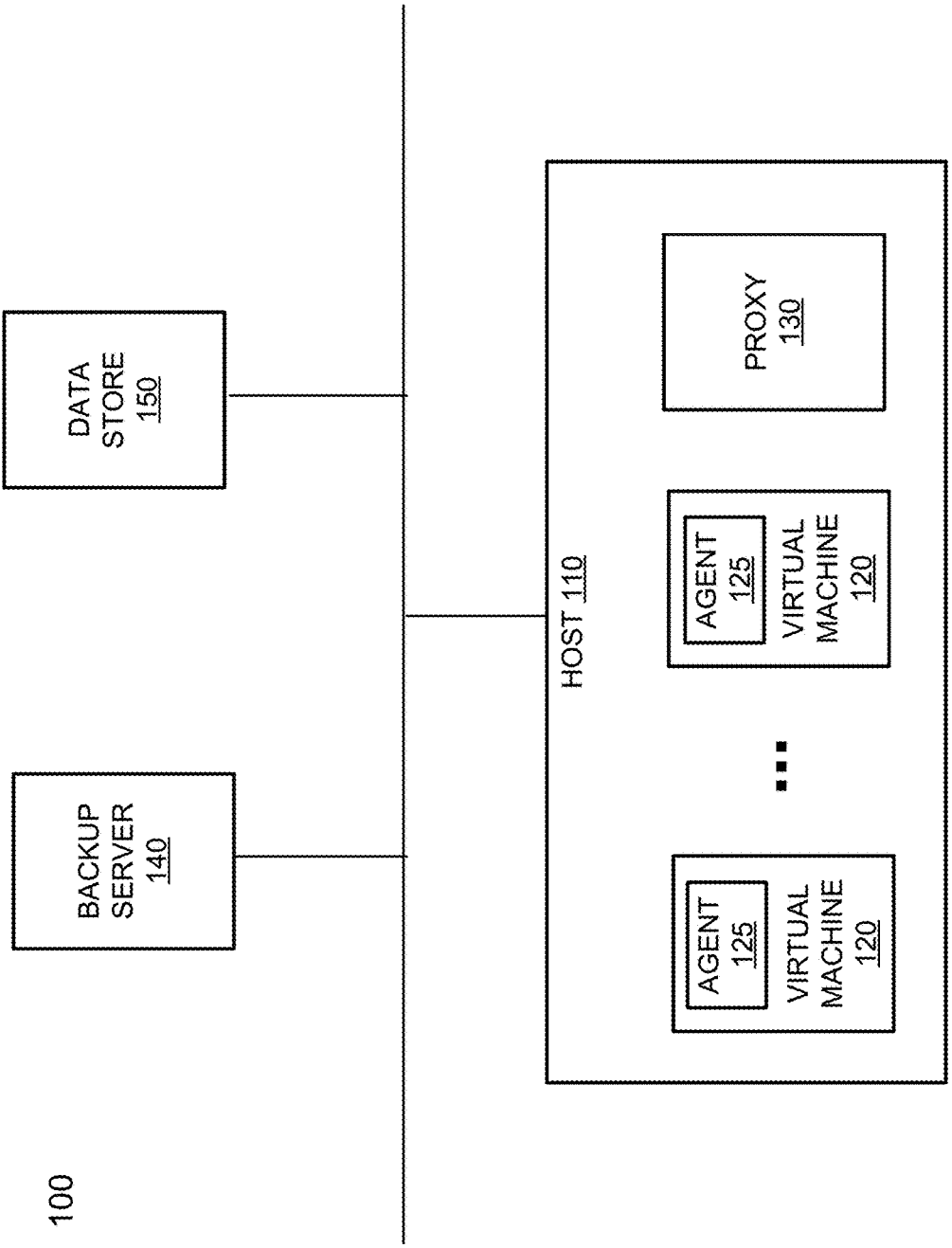
FIG. 1 is a block diagram illustrating an example environment for performing conventional proxy- or agent-based backup.

Referring to FIG. 1, a block diagram illustrating an example environment 100 for performing conventional proxy- or agent-based backup is shown. One or more virtual machines 120 reside on a host 110. The host 110 may comprise a hardware platform that runs specialized software (e.g., a hypervisor) to support the virtual machines 120. The virtual machines 120 may provide various services to users. Each virtual machine 120 may be associated with one or more virtual machine disk image files stored at the host 110, which represent disk drives inside the virtual machine 120.

Further, to allow for conventional proxy-based backup, a virtualized backup proxy 130 may also reside on the host 110. The proxy 130 may be a specialized virtual machine that facilitates data backup and restoration tasks executed on the host 110. The host 110 may be communicatively coupled with a backup server 140 and a data store 150. Thus, the proxy 130 may perform data backup and restoration operations under the control of the backup server 140. Data may be backed up from the host 110 to the data store 150, and may be restored from the data store 150 to the host 110. It should be appreciated that conventionally the unit of proxy-based backup is a virtual machine disk (in other words, a whole virtual machine disk image is backed up at a time during a backup session).

In addition, to allow for conventional agent-based backup, a backup agent 125 may be deployed in each virtual machine 120 whose data needs backing up. Agent-based backup is coordinated through the backup agent 125 under the control of the backup server 140. Agent-based backup is usually flexible, and can be used to back up application data and/or a file system. To perform an agent-based backup, the virtual machine 120 and the installed agent 125 both need to be running.

Figure 2:
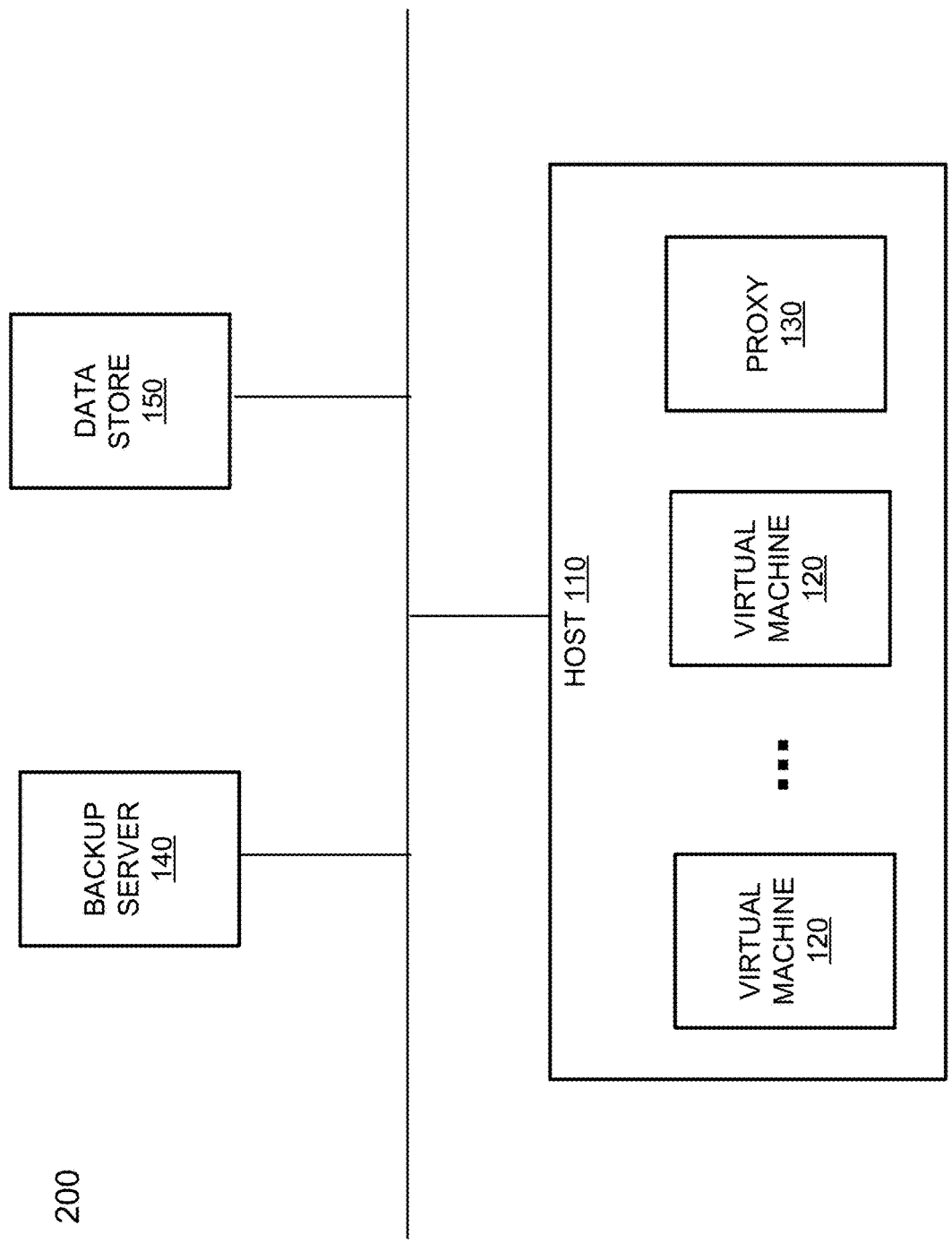
FIG. 2 is a block diagram illustrating an example environment for performing proxy-based partition backup, according to one embodiment of the disclosure.

Referring to FIG. 2, a block diagram illustrating an example environment 200 for performing proxy-based partition backup, according to one embodiment of the disclosure, is shown. The environment 200 of FIG. 2 is broadly similar to the environment 100 illustrated in FIG. 1, except that no agent is required to be installed in the virtual machines 120.

Figure 3:
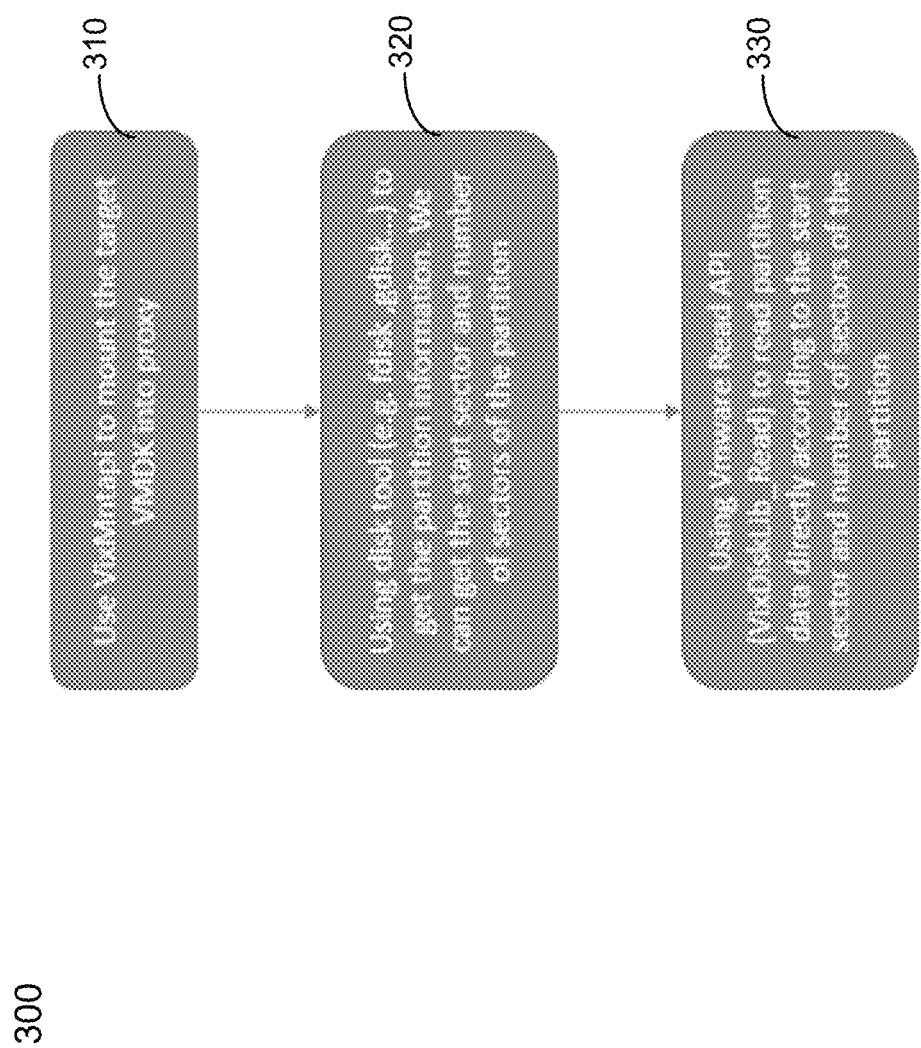
FIG. 3 is a flowchart illustrating an example method for performing proxy-based partition backup in a virtualized environment, according to one embodiment of the disclosure.

Referring to FIG. 3, a flowchart illustrating an example method 300 for performing proxy-based partition backup in a virtualized environment, according to one embodiment of the disclosure, is shown. At block 310, the backup source virtual machine disk may be mounted to the backup proxy. This may be achieved with a virtual machine disk application programming interface (API) (e.g., the VixMntapi library provided by VMware). At block 320, partition information for the backup source partition on the backup source virtual machine disk may be obtained at the proxy. The partition information may comprise the start sector of the partition and the number of sectors (i.e., sector count) of the partition, and may be obtained using such disk partitioning tools as fdisk, gdisk, etc. At block 330, partition data of the backup source partition may be read based on the partition information and backed up to the data store by the proxy. The partition data may be read using a virtual machine disk operations API (e.g., the VixDiskLib_Read API provided by VMware).

Figure 4:
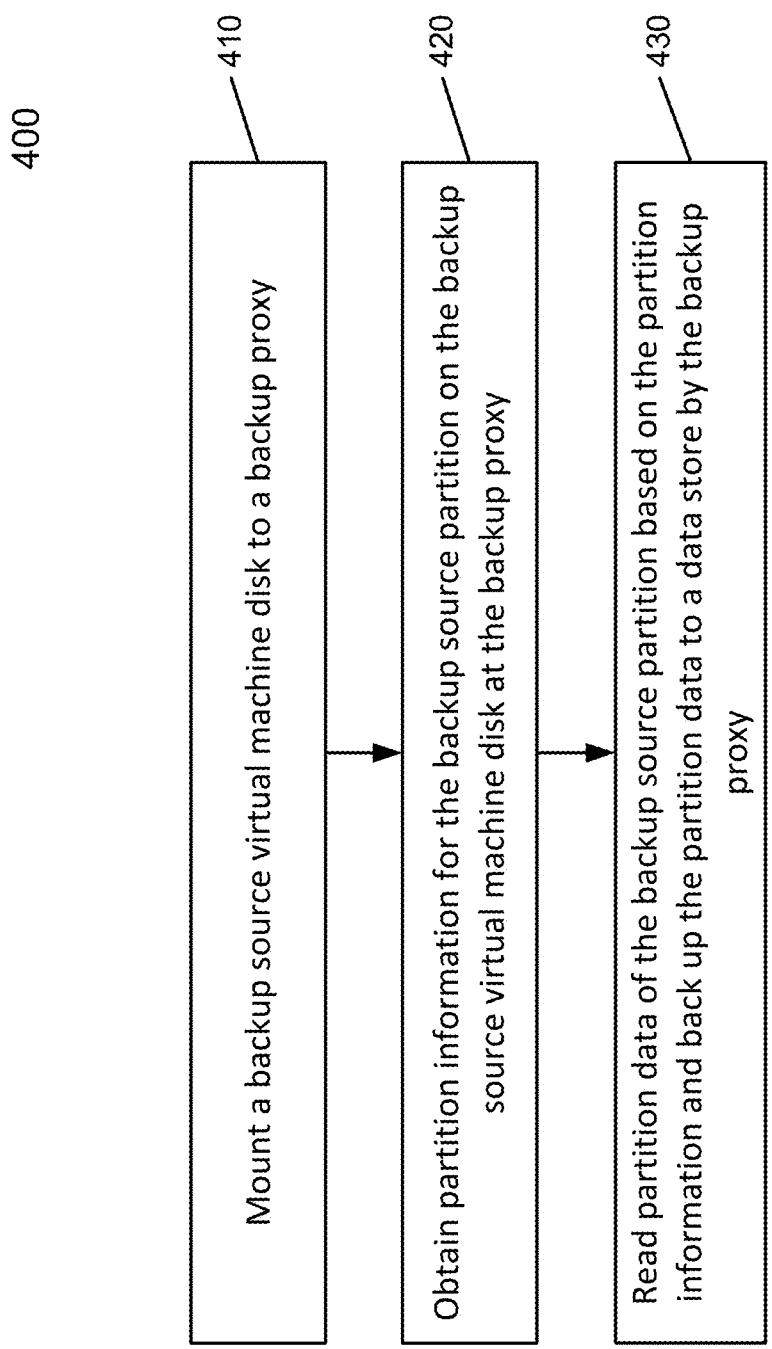
FIG. 4 is a flowchart illustrating an example method for performing proxy-based partition backup in a virtualized environment, according to one embodiment of the disclosure.

Referring to FIG. 4, a flowchart illustrating an example method 400 for performing proxy-based partition backup in a virtualized environment, according to one embodiment of the disclosure, is shown. At block 410, a backup source virtual machine disk may be mounted to a backup proxy. At block 420, partition information for the backup source partition on the backup source virtual machine disk may be obtained at the backup proxy. At block 430, partition data of the backup source partition may be read based on the partition information and backed up to a data store by the backup proxy.

Note that some or all of the components and operations as shown and described above (e.g., operations of methods 300, 400 illustrated in FIGS. 3-4) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, with the agent-less proxy-based partition backup techniques described herein, partition backup may be centrally performed under the control of the backup server without the need for the backup agent. The ability to perform partition level backup adds to the flexibility and efficiency of the virtual machine backup process. The proxy-based partition backup (and restore) can be performed while the virtual machine is not running. Further, the user does not need to manually exclude garbage or temporary data from being backed up as long as these data are not stored on the partition to be backed up.

Figure 5:
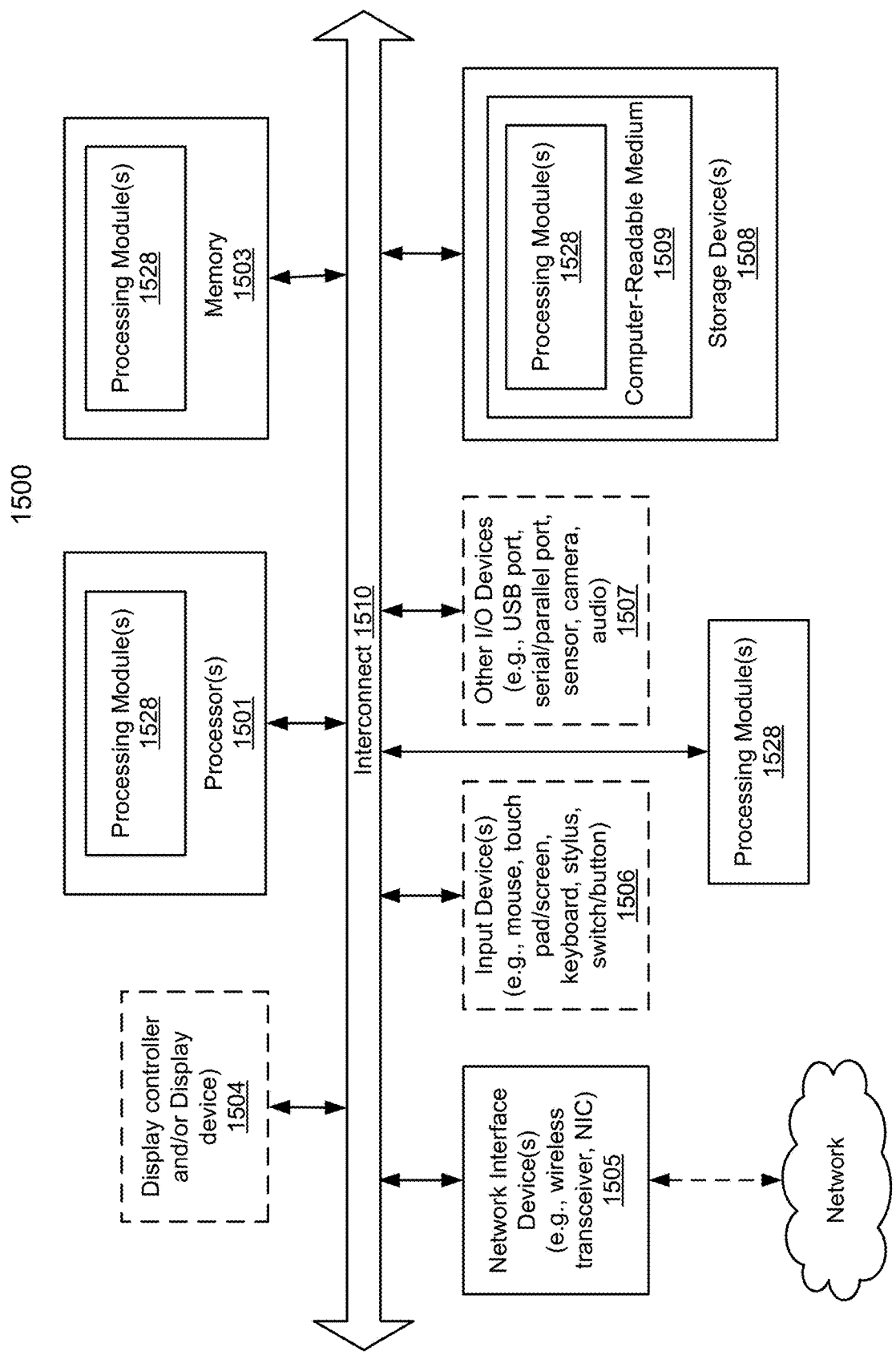
FIG. 5 is a block diagram illustrating a data processing system according to one embodiment.

FIG. 5 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for performing proxy-based partition backup in a virtualized environment, the method comprising:
   mounting a backup source virtual machine disk to a backup proxy, the virtual machine disk comprising a plurality of partitions;
   obtaining, at the backup proxy, partition information for a backup source partition of the plurality of partitions on the backup source virtual machine disk to provide partition level backup of the virtual machine, wherein the partition information comprises a start sector of the backup source partition and a sector count of the backup source partition; and
   reading, by the backup proxy, partition data directly from the backup source partition based on the start sector and the sector count of the backup source partition and backing up the partition data to a data store, wherein the backup source partition does not comprise garbage or temporary data.

2. The computer-implemented method of claim 1, wherein the backup proxy is controlled by a backup server.

3. The computer-implemented method of claim 1, wherein the mounting of the backup source virtual machine disk comprises utilizing a virtual machine disk application programming interface (API).

4. The computer-implemented method of claim 1, wherein the obtaining of the partition information comprises utilizing a disk partitioning tool.

5. The computer-implemented method of claim 1, wherein the reading of the partition data comprises utilizing a virtual machine disk operations API.

6. A non-transitory computer readable storage medium including instructions that, when executed by a processing device, cause the processing device to perform operations comprising:
   mounting a backup source virtual machine disk to a backup proxy, the virtual machine disk comprising a plurality of partitions;
   obtaining, at the backup proxy, partition information for a backup source partition of the plurality of partitions on the backup source virtual machine disk to provide partition level backup of the virtual machine, wherein the partition information comprises a start sector of the backup source partition and a sector count of the backup source partition; and
   reading, by the backup proxy, partition data directly from the backup source partition based on the start sector and sector count of the backup source partition and backing up the partition data to a data store, wherein the backup source partition does not comprise garbage or temporary data.

7. The non-transitory computer readable storage medium of claim 6, wherein the backup proxy is controlled by a backup server.

8. The non-transitory computer readable storage medium of claim 6, wherein mounting of the backup source virtual machine disk comprises utilizing a virtual machine disk application programming interface (API).

9. The non-transitory computer readable storage medium of claim 6, wherein obtaining of the partition information comprises utilizing a disk partitioning tool.

10. The non-transitory computer readable storage medium of claim 6, wherein reading of the partition data comprises utilizing a virtual machine disk operations API.

11. A data processing system, comprising:
    a processor; and
    a memory coupled to the processor to store instructions, which when executed by the processor, cause the processor to perform backup operations, the operations including:
       mounting a backup source virtual machine disk to a backup proxy, the virtual machine disk comprising a plurality of partitions;
       obtaining, at the backup proxy, partition information for a backup source partition of the plurality of partitions on the backup source virtual machine disk to provide partition level backup of the virtual machine, wherein the partition information comprises a start sector of the backup source partition and a sector count of the backup source partition; and reading, by the backup proxy, partition data directly from the backup source partition based on the start sector and a sector count of the backup source partition and backing up the partition data to a data store, wherein the backup source partition does not comprise garbage or temporary data.

12. The data processing system of claim 11, wherein the backup proxy is controlled by a backup server.

13. The data processing system of claim 11, wherein the mounting of the backup source virtual machine disk comprises utilizing a virtual machine disk application programming interface (API).

14. The data processing system of claim 11, wherein the obtaining of the partition information comprises utilizing a disk partitioning tool.

15. The data processing system of claim 11, wherein the reading of the partition data comprises utilizing a virtual machine disk operations API.

* * * * *